(12) United States Patent
Xu et al.

(10) Patent No.: US 11,703,660 B2
(45) Date of Patent: Jul. 18, 2023

(54) OPTICAL IMAGING LENS

(71) Applicant: GENIUS ELECTRONIC OPTICAL (XIAMEN) CO., LTD., Fujian (CN)

(72) Inventors: Ziwen Xu, Fujian (CN); Junya Liu, Fujian (CN); Yanxiao Wang, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 298 days.

(21) Appl. No.: 17/234,803

(22) Filed: Apr. 20, 2021

(65) Prior Publication Data

US 2022/0291483 A1 Sep. 15, 2022

(30) Foreign Application Priority Data

Mar. 15, 2021 (CN) .......................... 202110275890.7

(51) Int. Cl.
 G02B 27/00 (2006.01)
 G02B 9/34 (2006.01)
 G02B 13/00 (2006.01)
 G02B 5/22 (2006.01)
 G03B 30/00 (2021.01)
(52) U.S. Cl.
 CPC .................. *G02B 9/34* (2013.01); *G02B 5/22* (2013.01); *G02B 13/0015* (2013.01); *G03B 30/00* (2021.01)

(58) Field of Classification Search
 CPC ....... G02B 5/22; G02B 27/0018; G02B 5/003
 See application file for complete search history.

(56) References Cited

U.S. PATENT DOCUMENTS 9,638,832 B1 * 5/2017 Su ............................. G02B 7/02

* cited by examiner

*Primary Examiner* — Joseph P Martinez
(74) *Attorney, Agent, or Firm* — JCIPRNET

(57) ABSTRACT

An optical imaging lens including a front lens element group, a minimum-aperture light-shielding sheet and a rear lens element group sequentially arranged along an optical axis from an object side to an image side is provided. The front lens element group includes a first lens element. The first lens element includes a first surface facing the object side and a second surface facing the image side. The first surface includes an object-side surface allowing imaging rays to pass through and a non-optical effective area. The second surface includes an image-side surface allowing imaging rays to pass through and a non-optical effective area. The optical imaging lens further includes a light-absorbing layer disposed on the non-optical effective area of the second surface and an optical film disposed on a first surface of the minimum-aperture light-shielding sheet. The optical imaging lens satisfies the conditions of $2.200 \leq RLavg/RS0avg$ and $RLavg \leq 3.000\%$.

20 Claims, 16 Drawing Sheets

| Condition | Comparative Example | First embodiment | Second embodiment | Third embodiment | Fourth embodiment | Fifth embodiment |
|---|---|---|---|---|---|---|
| SD11 | 2.060 | 2.060 | 2.060 | 2.060 | 0.870 | 0.870 |
| SD12 | 1.240 | 1.240 | 1.240 | 1.240 | 0.620 | 0.620 |
| SD11/SD12 | 1.661 | 1.661 | 1.661 | 1.661 | 1.403 | 1.403 |
| RLmax | 0.961 | 0.899 | 1.177 | 0.958 | 1.191 | 1.469 |
| RLmin | 0.800 | 0.736 | 0.980 | 0.803 | 0.979 | 1.324 |
| RLavg | 0.881 | 0.818 | 1.079 | 0.881 | 1.085 | 1.397 |
| RS1max | 0.545 | 0.067 | | 0.070 | | |
| RS1min | 0.456 | 0.023 | | 0.024 | | |
| RS1avg | 0.501 | 0.045 | | 0.047 | | |
| RS0max | 0.596 | 0.077 | 0.076 | 0.314 | 0.074 | 0.596 |
| RS0min | 0.476 | 0.021 | 0.018 | 0.186 | 0.019 | 0.309 |
| RS0avg | 0.536 | 0.049 | 0.047 | 0.250 | 0.047 | 0.453 |
| RLavg/RS0avg | 1.643 | 16.684 | 22.947 | 3.522 | 23.333 | 3.086 |
| RLavg/RS1avg | 1.759 | 18.167 | | 18.734 | | |
| RS0avg/RS1avg | 1.071 | 1.089 | | 5.319 | | |

FIG. 19

OPTICAL IMAGING LENS

CROSS-REFERENCE TO RELATED APPLICATION

This application claims the priority benefit of China application serial no. 202110275890.7, filed on Mar. 15, 2021. The entirety of the above-mentioned patent application is hereby incorporated by reference herein and made a part of this specification.

BACKGROUND

Technical Field

The disclosure relates to an optical component, and particularly an optical imaging lens.

Description of Related Art

The minimum-aperture light-shielding sheet is the aperture of the optical imaging lens. According to various designs of optical imaging lenses, the minimum-aperture light-shielding sheet is generally arranged in front of the lens element or between the lens elements, but when the minimum-aperture light-shielding sheet is set between the lens elements and the inner edge radius of the minimum-aperture light-shielding sheet is smaller than the effective radius of the second surface of the first lens element facing the image side, the effective radius of the first surface of the first lens element facing the object side is greater than the effective radius of the second surface. Therefore, when the user observes from the object side of the optical imaging lens, the appearances of the second surface of the first lens element facing the image side and the first surface of the minimum-aperture light-shielding sheet facing the object side will be exposed and their colors are inconsistent with the color of the appearance of the lens barrel. Moreover, when the optical imaging lens is disposed in a portable electronic device, the problem of color inconsistency in appearance as mentioned above makes the optical imaging lens unable to be hidden in the black appearance of the portable electronic device.

SUMMARY

The disclosure provides an optical imaging lens that can exhibit better appearance consistency.

An embodiment of the disclosure provides an optical imaging lens, which includes a front lens element group, a minimum-aperture light-shielding sheet and a rear lens element group sequentially arranged along an optical axis from an object side to an image side. The front lens element group includes a first lens element. The first lens element includes a first surface facing the object side and a second surface facing the image side. The first surface includes an object-side surface allowing imaging rays to pass through and a non-optical effective area. The second surface includes an image-side surface allowing imaging rays to pass through and a non-optical effective area. The optical imaging lens further includes a light-absorbing layer disposed on the non-optical effective area of the second surface of the first lens element. The non-optical effective area of the second surface of the first lens element has a maximum reflectance as $RLmax$, a minimum reflectance as $RLmin$, and a maximum minimum average reflectance as $RLavg=(RLmax+RLmin)/2$ at an optical wavelength in a range of 450 to 750 nm. The minimum-aperture light-shielding sheet includes a first surface facing the object side, and an inner edge radius of the minimum-aperture light-shielding sheet is smaller than an effective radius of the image-side surface of the first lens element. The optical imaging lens further includes an optical film. The optical film is arranged on the first surface of the minimum-aperture light-shielding sheet. The first surface of the minimum-aperture light-shielding sheet has a maximum reflectance as $RS0max$, a minimum reflectance as $RS0min$, and a maximum minimum average reflectance as $RS0avg=(RS0max+RS0min)/2$ at an optical wavelength in a range of 450 to 750 nm. The optical imaging lens satisfies the conditions of $2.200 \leq RLavg/RS0avg$ and $RLavg \leq 3.000\%$.

An embodiment of the disclosure provides an optical imaging lens, which includes a front lens element group, a minimum-aperture light-shielding sheet and a rear lens element group sequentially arranged along an optical axis from an object side to an image side. The front lens element group includes a first lens element. The first lens element includes a first surface facing the object side and a second surface facing the image side. The first surface includes an object-side surface allowing imaging rays to pass through and a non-optical effective area. The second surface includes an image-side surface allowing imaging rays to pass through and a non-optical effective area. The optical imaging lens further includes a light-absorbing layer disposed on the non-optical effective area of the second surface of the first lens element. The non-optical effective area of the second surface of the first lens element has a maximum reflectance as $RLmax$, a minimum reflectance as $RLmin$, and a maximum minimum average reflectance as $RLavg=(RLmax+RLmin)/2$ at an optical wavelength in a range of 450 to 750 nm. The minimum-aperture light-shielding sheet includes a first surface facing the object side, and the inner edge radius of the minimum-aperture light-shielding sheet is smaller than the effective radius of the image-side surface of the first lens element. The optical imaging lens further includes an optical film. The optical film is arranged on the first surface of the minimum-aperture light-shielding sheet. The first surface of the minimum-aperture light-shielding sheet has a maximum reflectance as $RS0max$, a minimum reflectance as $RS0min$, and a maximum minimum average reflectance as $RS0avg=(RS0max+RS0min)/2$ at an optical wavelength in a range of 450 to 750 nm. The optical imaging lens satisfies the conditions of $SD11/SD12 \geq 1.300$, $RS0avg \leq 0.475\%$, and $RLavg \leq 3.000\%$, wherein $SD11$ is the effective radius of the object-side surface of the first lens element, and $SD12$ is the effective radius of the image-side surface of the first lens element.

Based on the above, the advantageous effect of the optical imaging lens of the embodiment of the disclosure is that by increasing the ratio of the reflectance of the non-optical effective area of the second surface of the first lens element to the reflectance of the first surface of the minimum-aperture light-shielding sheet, it is possible to make the optical imaging lens appear nearly uniformly black under the illumination of a light source. Moreover, when the optical imaging lens is disposed in a portable electronic device, the optical imaging lens can be well hidden in the black appearance of the portable electronic device. Therefore, a better effect with less color difference in the appearance of the lens can be achieved.

BRIEF DESCRIPTION OF THE DRAWINGS

FIG. 19 shows important parameters and relation values thereof pertaining to the optical imaging lens according to the comparative example and the first through the fifth embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
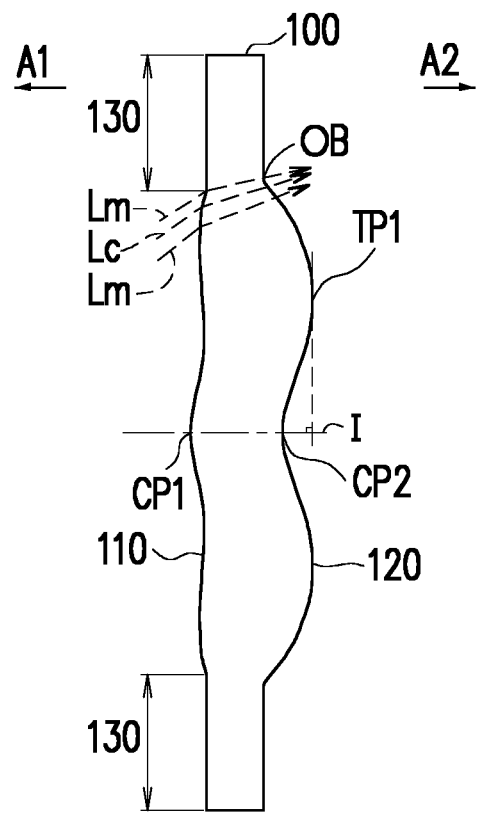
FIG. 1 is a schematic view illustrating the surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
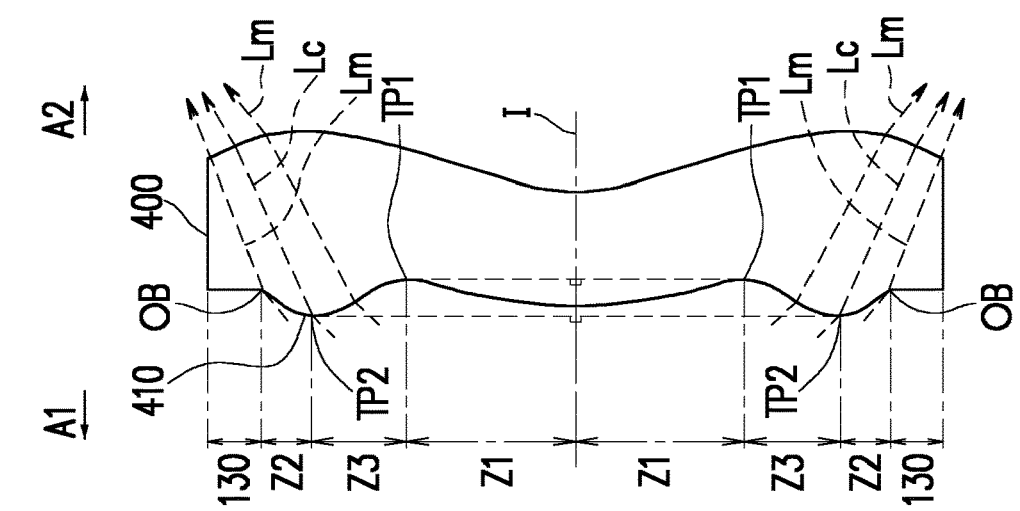
FIG. 4 is a schematic view illustrating a surface structure of a lens element according to an Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis Ion the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
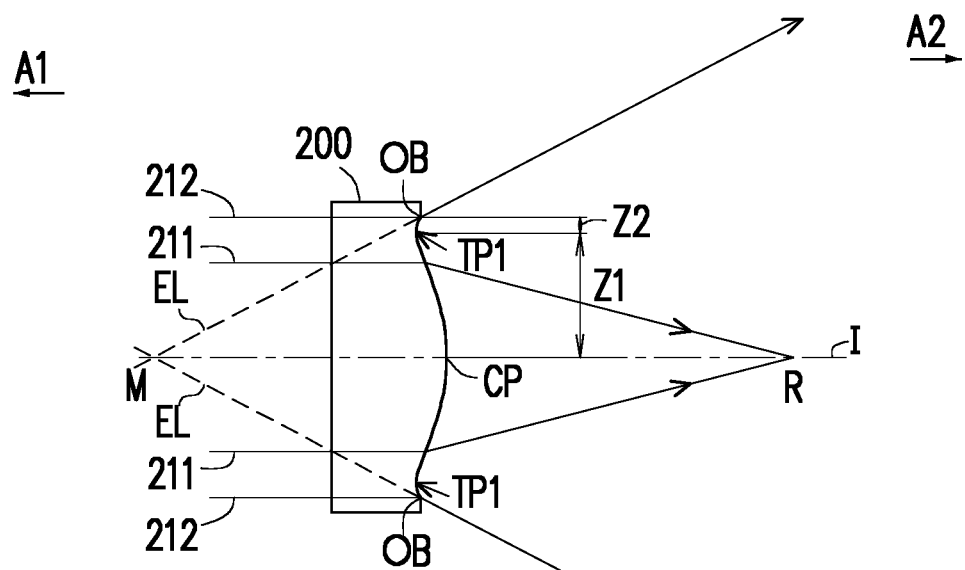
FIG. 2 is a schematic view illustrating a concave-convex surface structure of a lens element and a ray focal point.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
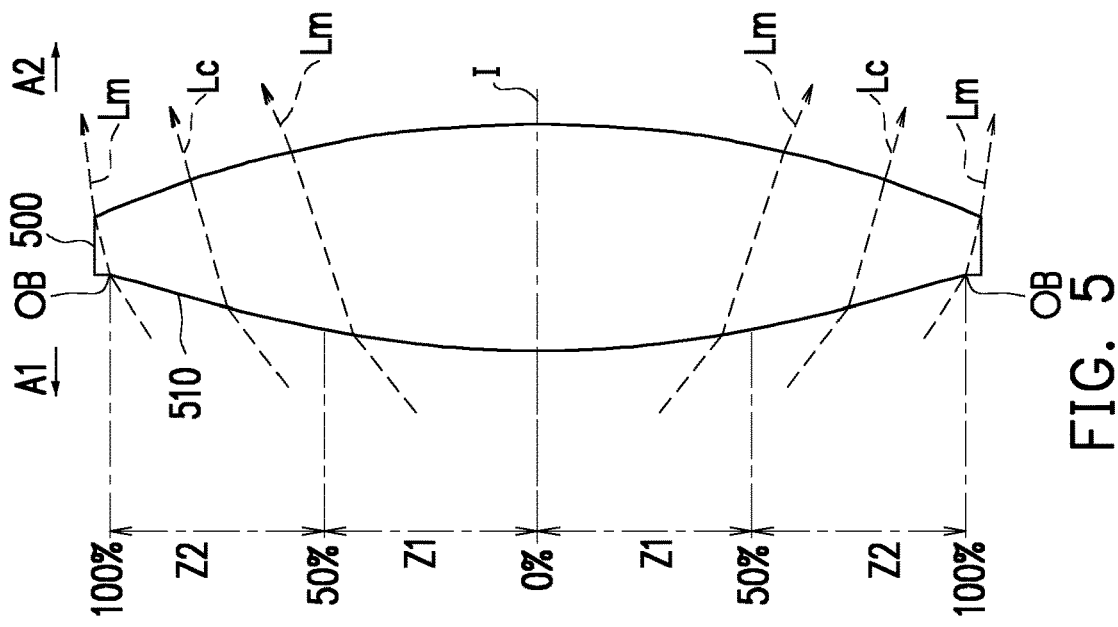
FIG. 5 is a schematic view illustrating a surface structure of a lens element according to an Example 3.
Figure 3:
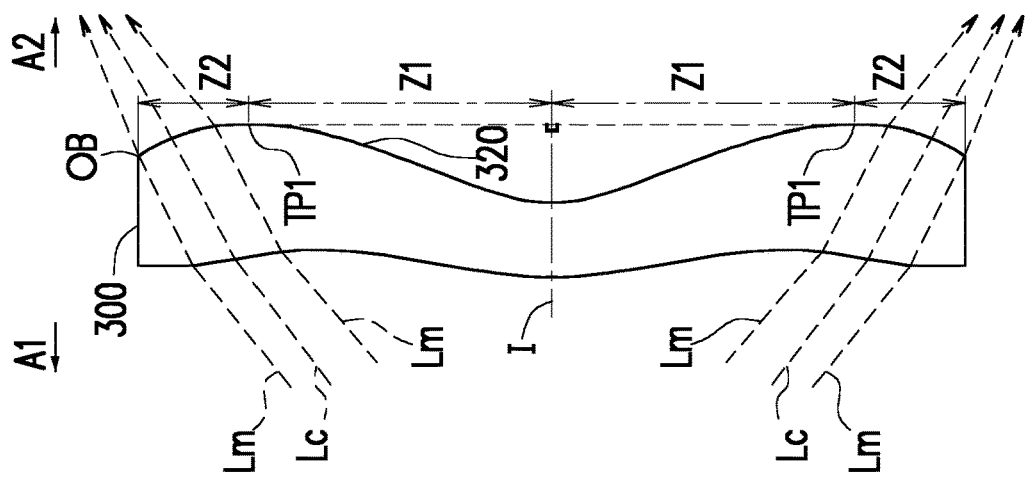
FIG. 3 is a schematic view illustrating a surface structure of a lens element according to an Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
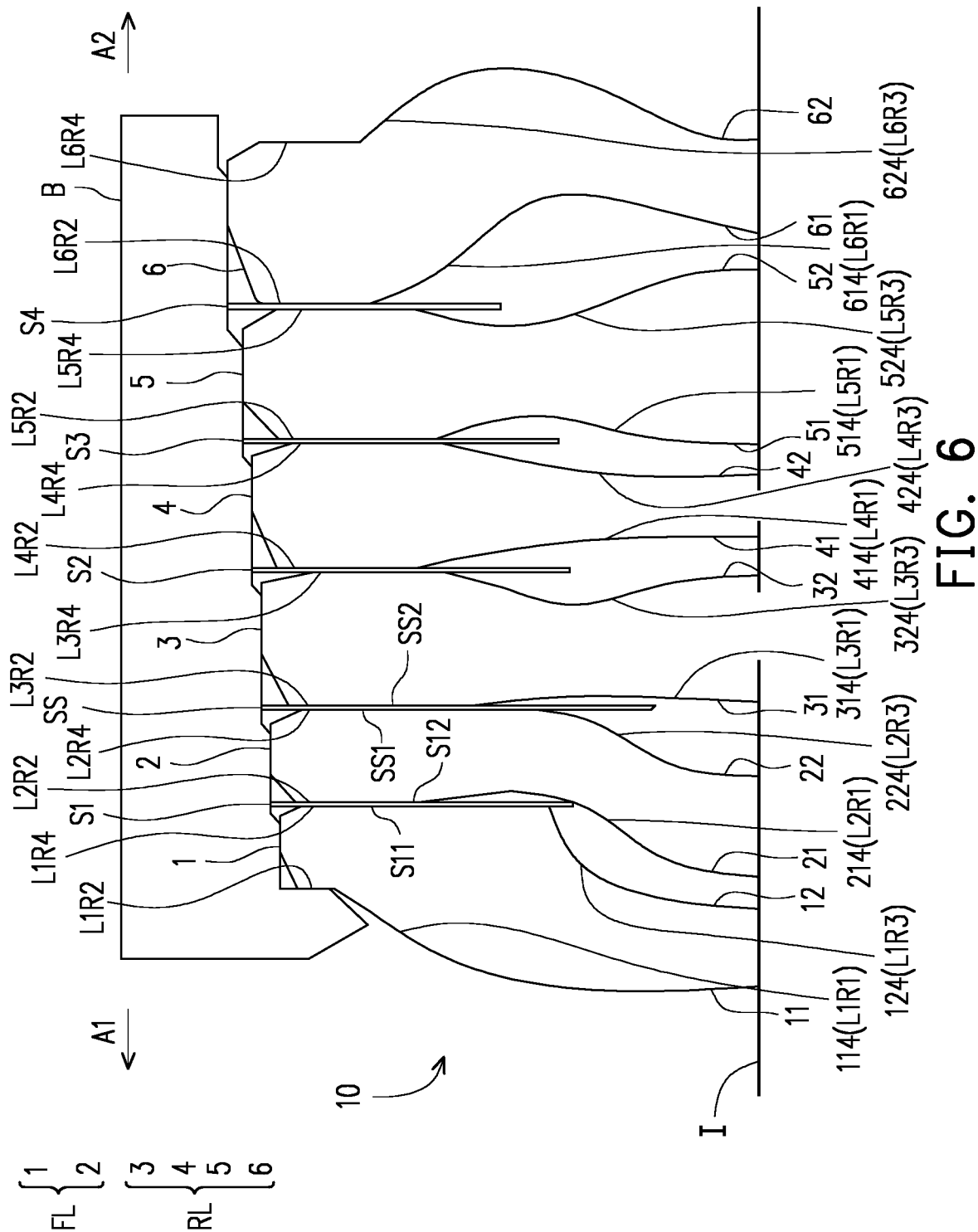
FIG. 6 is a schematic view illustrating an imaging optical lens according to a first embodiment of the disclosure.
Figure 7:
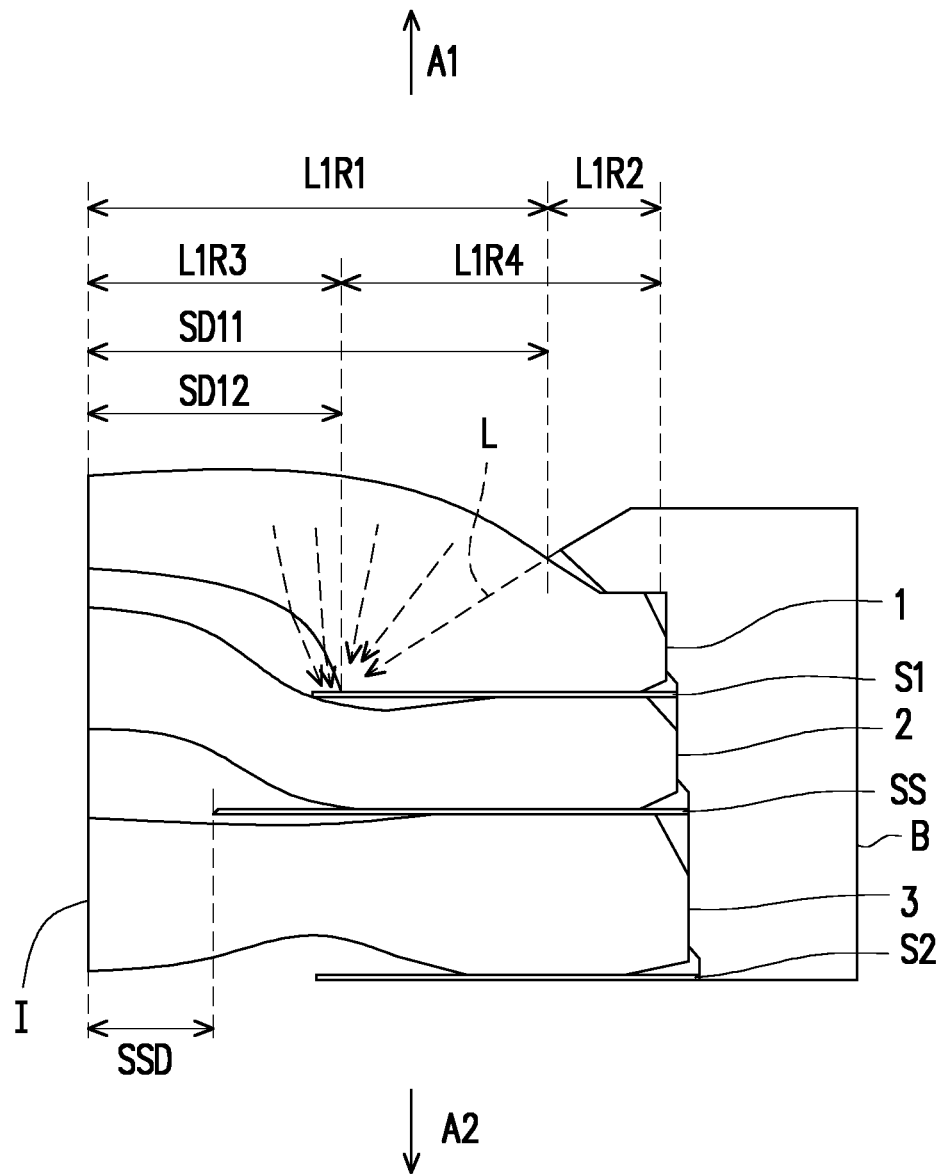
FIG. 7 shows a partial schematic view of the optical imaging lens of the first embodiment of the disclosure, in which light is incident to a first light-shielding sheet.
Figure 8:
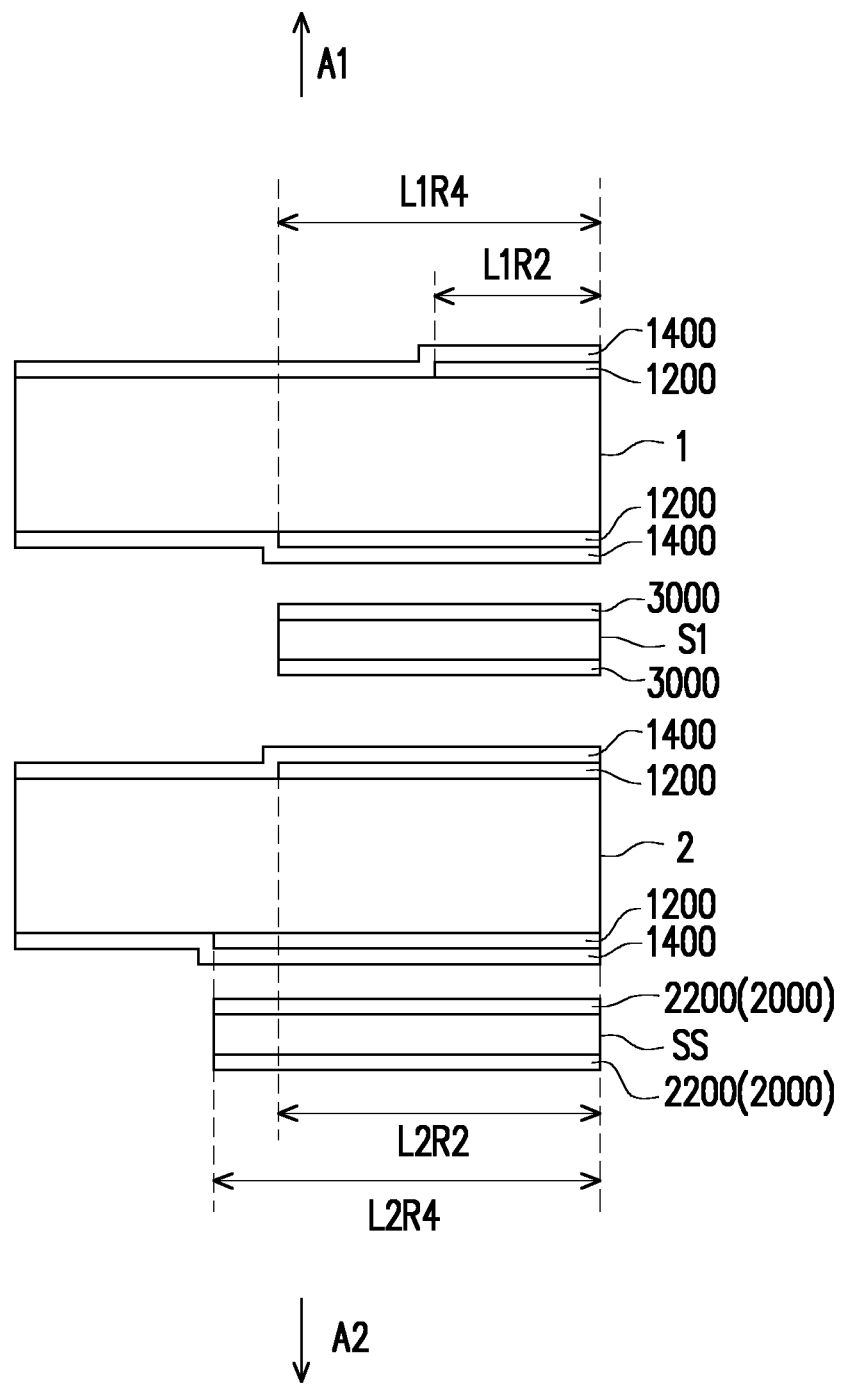
FIG. 8 is a schematic view showing the arrangement of optical layers on the optical imaging lens of the first embodiment of the disclosure.

FIG. 6 is a schematic view illustrating an imaging optical lens according to a first embodiment of the disclosure. FIG. 7 shows a partial schematic view of the optical imaging lens of the first embodiment of the disclosure, in which light is incident to a first light-shielding sheet. FIG. 8 is a schematic view showing the arrangement of optical layers on the optical imaging lens of the first embodiment of the disclosure. Referring to FIG. 6 and FIG. 7 first, the optical imaging lens 10 of the first embodiment of the disclosure includes a front lens element group FL, a minimum-aperture light-shielding sheet SS and a rear lens element group RL sequentially along an optical axis I of the optical imaging lens 10 from an object side A1 to an image side A2. The front lens element group FL includes a first lens element 1 and a second lens element 2. The rear lens element group RL includes a third lens element 3, a fourth lens element 4, a fifth lens element 5 and a sixth lens element 6. It is additionally noted that the object side A1 is the side facing the object to be captured, and the image side A2 is the side facing the imaging surface.

In this embodiment, the first lens element 1, the second lens element 2, the third lens element 3, the fourth lens element 4, the fifth lens element 5, and the sixth lens element 6 of the optical imaging lens 10 each include a first surface 11, 21, 31, 41, 51, 61 facing the object side A1 and an image-side surface 12, 22, 32, 42, 52, 62 facing the image side A2.

In this embodiment, the first lens element 1 is arranged to be a lens element in a first order from the object side A1 to the image side A2. The first surface 11 of the first lens element 1 includes an object-side surface L1R1 allowing the imaging rays to pass through and a non-optical effective area L1R2. The second surface 12 of the first lens element 1 includes an image-side surface L1R3 allowing imaging rays to pass through and a non-optical effective area L1R4. A periphery region 114 of the object-side surface L1R1 of the first lens element 1 is convex. A periphery region 124 of the image-side surface L1R3 of the first lens element 1 is concave. The effective radius SD11 of the object-side surface L1R1 of the first lens element 1 is 2.060 mm, and the effective radius SD12 of the image-side surface L1R3 of the first lens element 1 is 1.240 mm, wherein the effective radius is half of the optical effective diameter. In addition, the material of the first lens element 1 can be plastic or glass, and the object-side surface L1R1 and the image-side surface L1R3 of the first lens element 1 can be a spherical surface or an aspheric surface, the disclosure provides no limitation thereto.

In this embodiment, the second lens element 2 is arranged to be a lens element in a second order from the object side A1 to the image side A2. The first surface 21 of the second lens element 2 includes an object-side surface L2R1 allowing imaging rays to pass through and a non-optical effective area L2R2. The second surface 22 of the second lens element 2 includes an image-side surface L2R3 allowing imaging rays to pass through and a non-optical effective area L2R4. A periphery region 214 of the object-side surface L2R1 of the second lens element 2 is convex. A periphery region 224 of the image-side surface L2R3 of the second lens element 2 is concave. In addition, the material of the second lens element 2 can be plastic or glass, and the object-side surface L2R1 and the image-side surface L2R3 of the second lens element 2 can be a spherical surface or an aspherical surface, the disclosure provides no limitation thereto.

In this embodiment, the third lens element 3 is arranged to be a lens element in a third order from the object side A1 to the image side A2. The first surface 31 of the third lens element 3 includes an object-side surface L3R1 allowing imaging rays to pass through and a non-optical effective area L3R2. The second surface 32 of the third lens element 3 includes an image-side surface L3R3 allowing imaging rays to pass through and a non-optical effective area L3R4. A periphery region 314 of the object-side surface L3R1 of the third lens element 3 is convex. A periphery region 324 of the image-side surface L3R3 of the third lens element 3 is convex. In addition, the material of the third lens element 3 can be plastic or glass, and the object-side surface L3R1 and the image-side surface L3R3 of the third lens element 3 can be a spherical surface or an aspherical surface, the disclosure provides no limitation thereto.

In this embodiment, the fourth lens element 4 is arranged to be a lens element in a fourth order from the object side A1 to the image side A2. The first surface 41 of the fourth lens element 4 includes an object-side surface L4R1 allowing imaging rays to pass through and a non-optical effective area L4R2. The second surface 42 of the fourth lens element 4 includes an image-side surface L4R3 allowing imaging rays to pass through and a non-optical effective area L4R4. A periphery region 414 of the object-side surface L4R1 of the fourth lens element 4 is concave. A periphery region 424 of the image-side surface L4R3 of the fourth lens element 4 is concave. In addition, the material of the fourth lens element 4 can be plastic or glass, and the object-side surface L4R1 and the image-side surface L4R3 of the fourth lens element 4 can be a spherical surface or an aspherical surface, the disclosure provides no limitation thereto.

In this embodiment, the fifth lens element 5 is arranged to be a lens element in a fifth order from the object side A1 to the image side A2. The first surface 51 of the fifth lens element 5 includes an object-side surface L5R1 allowing imaging rays to pass through and a non-optical effective area L5R2. The second surface 52 of the fifth lens element 5 includes an image-side surface L5R3 allowing imaging rays to pass through and a non-optical effective area L5R4. A periphery region 514 of the object-side surface L5R1 of the fifth lens element 5 is convex. A periphery region 524 of the image-side surface L5R3 of the fifth lens element 5 is convex. In addition, the material of the fifth lens element 5 can be plastic or glass, and the object-side surface L5R1 and the image-side surface L5R3 of the fifth lens element 5 can be a spherical surface or an aspherical surface, the disclosure provides no limitation thereto.

In this embodiment, the sixth lens element 6 is arranged to be a lens element in a sixth order from the object side A1 to the image side A2. The first surface 61 of the sixth lens element 6 includes an object-side surface L6R1 allowing imaging rays to pass through and a non-optical effective area L6R2. The second surface 62 of the sixth lens element 6 includes an image-side surface L6R3 allowing imaging rays to pass through and a non-optical effective area L6R4. A periphery region 614 of the object-side surface L6R1 of the sixth lens element 6 is concave. A periphery region 624 of the image-side surface L6R3 of the sixth lens element 6 is convex. In addition, the material of the sixth lens element 6 can be plastic or glass, and the object-side surface L6R1 and the image-side surface L6R3 of the sixth lens element 6 can be a spherical surface or an aspherical surface, the disclosure provides no limitation thereto.

In addition, the front lens element group FL of this embodiment further includes a first light-shielding sheet S1, and the rear lens element group RL further includes a second light-shielding sheet S2, a third light-shielding sheet S3, and a fourth light-shielding sheet. S4. The first light-shielding sheet S1 is disposed between the first lens element 1 and the second lens element 2. The second light-shielding sheet S2 is disposed between the third lens element 3 and the fourth lens element 4. The third light-shielding sheet S3 is disposed between the fourth lens element 4 and the fifth lens element 5. The fourth light-shielding sheet S4 is disposed between the fifth lens element 5 and the sixth lens element 6. In this embodiment, the minimum-aperture light-shielding sheet SS and the first light-shielding sheet S1 each include a first surface SS1 and S11 facing the object side A1, and a second surface SS2 and S12 facing the image side A2.

In this embodiment, the inner edge radius SSD of the minimum-aperture light-shielding sheet SS is smaller than the effective radius SD12 of the image-side surface L1R3 of the first lens element 1.

Please refer to FIG. 8. In this embodiment, the optical imaging lens 10 further includes a light-absorbing layer 1200 and a light-transmitting layer 1400. The light-transmitting layer 1400 and the light-absorbing layer 1200 are arranged on various lens elements. For example, the light-absorbing layer 1200 is arranged on the non-optical effective area L1R4 of the second surface 12 of the first lens element 1 or on the non-optical effective area L1R2 of the first surface 11. The light-transmitting layer 1400 is disposed on the light-absorbing layer 1200 of the non-optical effective area L1R4 of the second surface 12 of the first lens element 1 or on the light-absorbing layer 1200 of the non-optical effective area L1R2 of the first surface 11 of the first lens element 1. The light-absorbing layer 1200 and the light-transmitting layer 1400 are, for example, sequentially plated on the first lens element 1 by pad printing or spraying, so that the light-absorbing layer 1200 can completely cover the non-optical effective areas L1R2 and L1R4 of the first lens element 1, or the light-transmitting layer 1400 can completely cover the object-side surface L1R1 and the image-side surface L1R3 of the first lens element 1. In addition, the material of the light-transmitting layer 1400 may be an anti-reflective material, and the material of the light-absorbing layer 1200 may include a black resin material.

In this embodiment, the optical coefficients of the light-absorbing layer 1200 and the light-transmitting layer 1400 determine the values of parameters such as RLmax, RLmin, or RLavg, wherein RLmax, RLmin, and RLavg are respectively the maximum reflectance, the minimum reflectance, and the maximum minimum average reflectance RLavg=(RLmax+RLmin)/2 at an optical wavelength in a range of 450 to 750 nm, which are measured by choosing a point in the non-optical effective area L1R4 of the second surface 12 of the first lens element 1. In this embodiment, the arrangement of the light-absorbing layer 1200 and the light-transmitting layer 1400 enables the optical imaging lens 10 to satisfy the following condition: RLavg≤1.200%. Since the light-transmitting layer 1400 is disposed on the light-absorbing layer 1200, most of the light can penetrate through and reach the light-absorbing layer 1200 to be absorbed, thereby reducing the reflectance, so that the optical imaging lens 10 has a matt black appearance.

In this embodiment, the optical imaging lens 10 further includes an optical film 3000 disposed on the first surface S11 of the first light-shielding sheet S1, but it is not limited thereto, and the other surface opposite to the first surface S11 may also be simultaneously provided with the optical film 3000, wherein the first light-shielding sheet S1 may be a black light-absorbing sheet, and the optical film 3000 may be a light-absorbing layer or a light-transmitting layer.

In this embodiment, the optical coefficients of the first light-shielding sheet S1 and the optical film 3000 determine the values of parameters such as RS1max, RS1min or RS1avg, wherein RS1max, RS1min, and RS1avg are respectively the maximum reflectance, the minimum reflectance, and the maximum minimum average reflectance RS1avg=(RS1max+RS1min)/2 at an optical wavelength in a range of 450 to 750 nm, which are measured by choosing a point at the first surface S11 of the first light-shielding sheet S1. In this embodiment, the arrangement of the first light-shielding sheet S1 and the optical film 3000 enables the optical imaging lens 10 to further satisfy the following condition: SD11/SD12≥1.600 and RS1avg≤0.200%. When SD11/SD12 is greater than 1.600, an exposed area of the second surface 12 of the first lens 1 occupies about 60% of the optical effective area of the object side A1 (that is, the object-side surface L1R1), which affects the appearance of the optical imaging lens 10 and accepts light from more angles. Therefore, when the condition RS1avg≤0.200% is satisfied, it helps to make the color difference between the black color exposed by the non-optical effective area L1R4 of the second surface 12 of the first lens element 1 and the black color exposed by the first light-shielding sheet S1 look more similar to human eye, so that the optical imaging lens 10 presents a nearly uniform black appearance under the illumination of a light source.

In this embodiment, the optical imaging lens 10 further includes an optical film 2000. The optical film 2000 is arranged on the first surface SS1 of the minimum-aperture light-shielding sheet SS or on the other surface opposite to the first surface SS1, wherein the minimum-aperture light-shielding sheet SS may be a black light-absorbing sheet. Moreover, the optical film 2000 may be a light-absorbing layer 2200. The light-absorbing layer 2200 is, for example, a metal nitride, a metal fluoride, a metal hydride, a metal oxide, a semiconductor element, a nitride of a semiconductor element, a fluoride of a semiconductor element, a hydride of a semiconductor element, or a hydroxide of a semiconductor element or a combination of the above, wherein the selection of the material of the light-absorbing layer 2200 facilitates mass production at one time.

In this embodiment, the optical coefficients of the minimum-aperture light-shielding sheet SS and the optical film 2000 determine the values of parameters such as RS0max, RS0min, or RS0avg, wherein RS0max, RS0min, and RS0avg are respectively the maximum reflectance, the minimum reflectance, and the maximum minimum average reflectance RS0avg=(RS0max+RS0min)/2 at an optical wavelength in a range of 450 to 750 nm, which are measured by choosing a point on the first surface SS1 of the minimum-aperture light-shielding sheet SS.

In addition, the relationship between important parameters of the optical imaging lens 10 of the first embodiment is shown in FIG. 19. In order to further make the appearance of the optical imaging lens 10 to look more consistent in color under light irradiation, the embodiments of the disclosure can have better effects when the numerical limits of the following conditions are satisfied.

The optical imaging lens 10 of the embodiment of the disclosure satisfies the following condition: SD11/SD12≥1.600 and 4.000≤RLavg/RS1avg. When SD11/SD12 is greater than 1.600, the second surface 12 of the first lens element 1 will be exposed and occupy about 60% of the optical effective area of the first surface 11 of the first lens element 1 (that is, the object-side surface L1R1), thereby affecting the appearance of the optical imaging lens 10 and accept light from more angles. Therefore, when the condition 4.000≤RLavg/RS1avg is satisfied, it helps to increase the ratio of the reflectance of the non-optical effective area L1R4 of the second surface 12 of the first lens element 1 to the reflectance of the first surface SS1 of the first light-shielding sheet S1, so that the color difference between the black color exposed by the non-optical effective area L1R4 of the second surface 12 of the first lens element 1 and the black color exposed by the first light-shielding sheet S1 looks more similar to human eye, and therefore the optical imaging lens 10 presents a nearly uniform black appearance under the illumination of a light source. In a preferred embodiment, the preferred range is 4.000 RLavg/RS1avg≤34.000, so that the reflectance of the light-shielding sheet will not be too low and affect the appearance consistency.

The optical imaging lens 10 of the embodiment of the disclosure further satisfies the following condition: 1.100≤RS0avg/RS1avg. Since the first light-shielding sheet S1 is closer to the object side A1 than the minimum-aperture light-shielding sheet SS, the first light-shielding sheet S1 blocks the stray light that is from the object side A1 and cannot be blocked by the minimum-aperture light-shielding sheet SS, when the optical imaging lens 10 satisfies this condition, it helps to make the color difference between the black color exposed by the minimum-aperture light-shielding sheet SS and the black color exposed by the first light-shielding sheet S1 to look more similar to human eye. In a preferred embodiment, the preferred range is 1.100≤RS0avg/RS1avg≤8.000.

The optical imaging lens 10 of the embodiment of the disclosure further satisfies the following condition: 2.200≤RLavg/RS0avg≤15.000. Since the first light-shielding sheet S1 is closer to the object side A1 than the minimum-aperture light-shielding sheet SS, the first light-shielding sheet S1 blocks the stray light that is from the object side A1 and cannot be blocked by the minimum-aperture light-shielding sheet SS, when the optical imaging lens 10 satisfies this condition, it helps to make the color difference between the black color exposed by the minimum-aperture light-shielding sheet SS and the black color exposed by the first light-shielding sheet S1 to look more similar to human eye.

Figure 9:
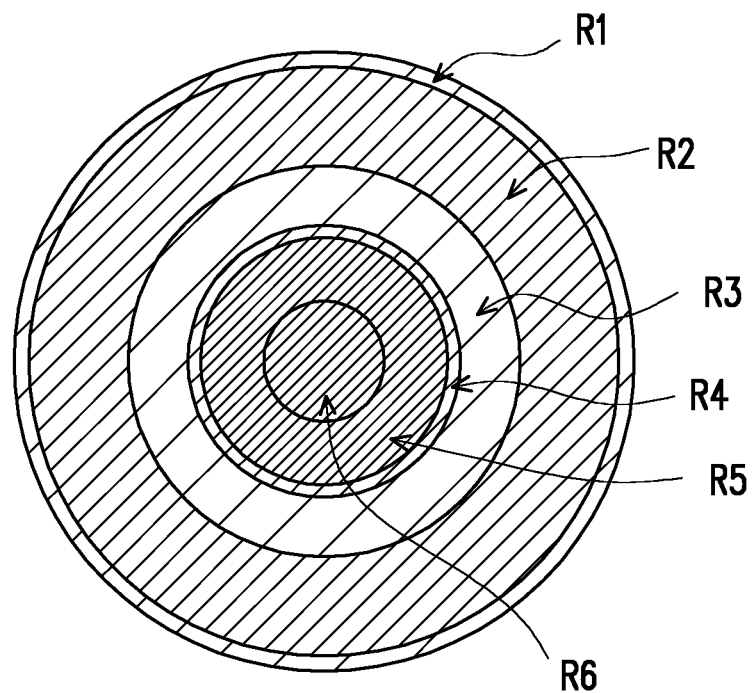
FIG. 9 shows a schematic view of the appearance of the optical imaging lens of the first embodiment of the disclosure, viewing from the object side to the image side.

FIG. 9 shows a schematic view of the appearance of the optical imaging lens of the first embodiment of the disclosure, viewing from the object side A1 to the image side A2. Please refer to FIG. 9. In FIG. 9, the first region R1, the second region R2, the third region R3, the fourth region R4, the fifth region R5, and the sixth region R6 respectively schematically show the color scale of the black color of the appearance of various regions being irradiated by light, including the lens barrel B, the second surface 12 of the first lens element 1, the first light-shielding sheet S1, the second surface 22 of the second lens element 2, the minimum-aperture light-shielding sheet SS and an area within the inner edge radius SSD of the minimum-aperture light-shielding sheet SS.

Figure 10:
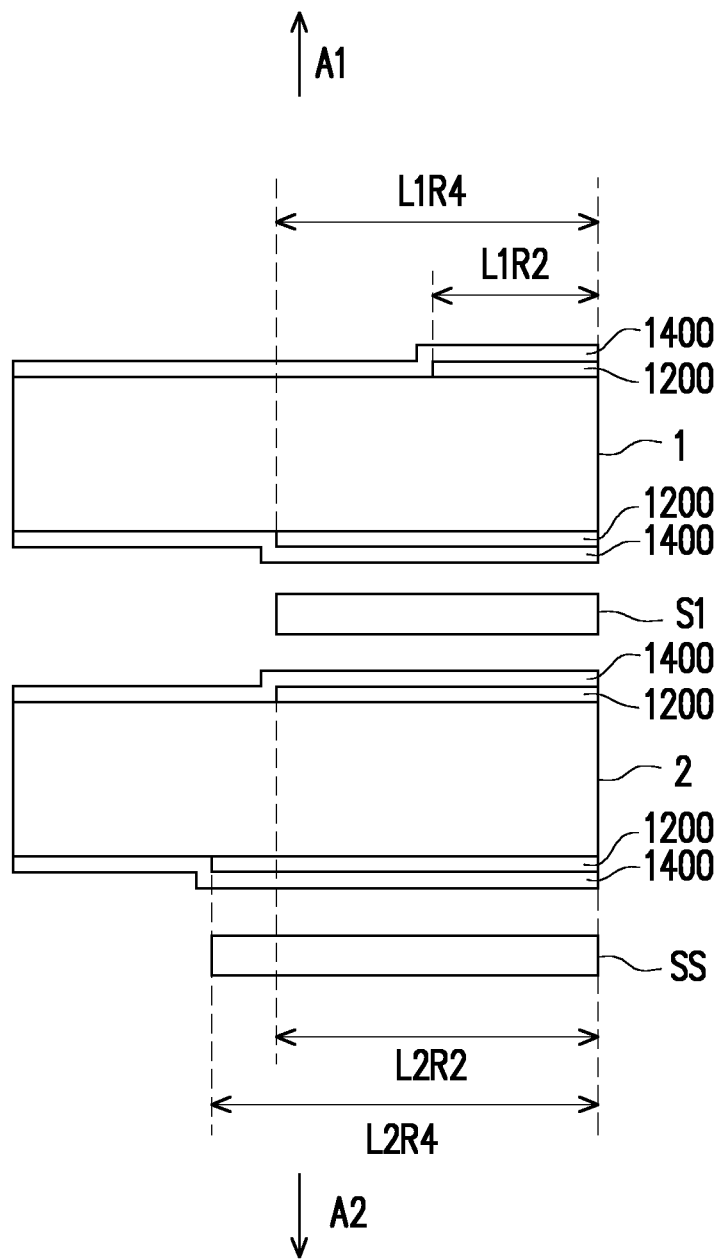
FIG. 10 is a schematic view showing the arrangement of optical layers on the optical imaging lens of a comparative example of the disclosure.

FIG. 10 is a schematic view showing the arrangement of optical layers on the optical imaging lens of a comparative example of the disclosure. Referring to FIG. 10, the optical imaging lens of the comparative example (FIG. 10) is similar to the optical imaging lens 10 of the first embodiment (FIG. 6), and the differences between the two are as follows: there is no optical film provided on the first light-shielding sheet S1 of the optical imaging lens in the comparative example, and there is no optical film provided on the minimum-aperture light-shielding sheet SS. In addition, as shown in FIG. 19, the reflectance of the optical imaging lens of the comparative example at various lens elements and light-shielding sheet is different from the optical imaging lens 10 of the first embodiment.

Figure 11:
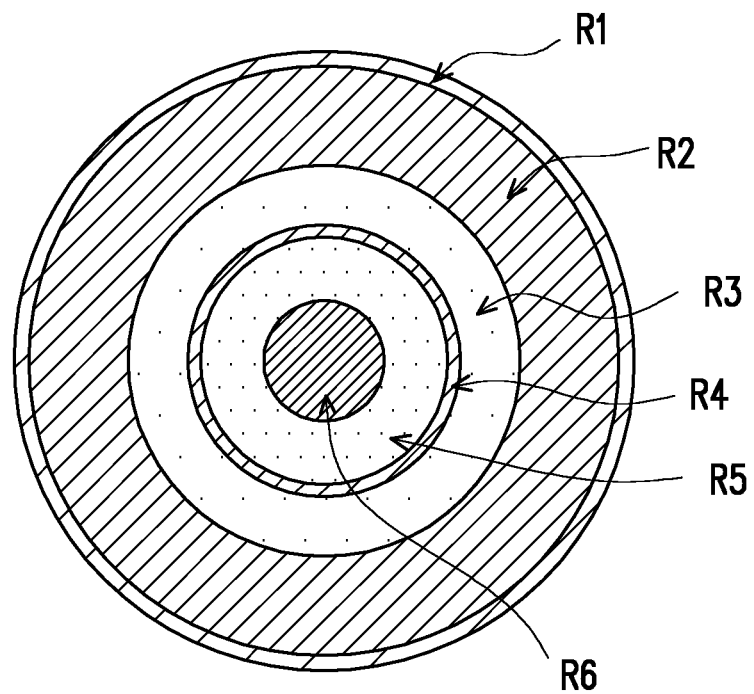
FIG. 11 shows a schematic view of the appearance of the optical imaging lens of the comparative example of the disclosure, viewing from the object side to the image side.

FIG. 11 shows a schematic view of the appearance of the optical imaging lens of the comparative example of the disclosure, viewing from the object side A1 to the image side A2. Referring to FIG. 9 and FIG. 11 at the same time, in a comparative example, the non-optical effective area L1R4 of the second surface 12 of the first lens element 1 is provided with the light-absorbing layer 1200 and the light-transmitting layer 1400, so that the non-optical effective area L1R4 exposed by the second surface 12 of the first lens element 1 has the maximum minimum average reflectance of 0.881% at an optical wavelength ranging from 400 to 750 nm. The first light-shielding sheet S1 having the maximum minimum average reflectance of about 0.501% at an optical wavelength ranging from 400 to 750 nm is incorporated, a gray ring was still found to occur. After spending time and painstaking research and trying to reduce the reflectance of the non-optical effective area L1R4 of the second surface 12 of the first lens element 1, it was found that the appearance inconsistency was more obvious. After several times of disassembly and testing, it was found that the gray ring was not caused by the non-optical effective area L1R4 of the second surface 12 of the first lens element 1 with higher reflectance, but caused by the first light-shielding sheet S1 with a reflectance of nearly 1.758 times lower. On the contrary, as the more reflectance of the lens element is reduced, the more the contrast of color difference between the appearance of the non-optical effective area L1R4 of the second surface 12 of the first lens element 1 and the appearance of the first surface S11 of the first light-shielding sheet S1 is increased, and the more obvious the color inconsistency is as well. Through optical software simulation and experimentation, it is found that when the inner edge radius SSD of the minimum-aperture light-shielding sheet SS of the optical imaging lens is smaller than the effective radius SD12 of the second surface 12 of the first lens element 1, the field of view angle of the optical imaging lens is normally greater than or equal to 90 degrees. If the periphery region 114 of the object-side surface L1R1 of the first lens element 1 is convex, and the periphery region 124 of the image-side surface L1R3 of the first lens element 1 is concave, a large amount of light will be condensed when the imaging ray passes through the first lens element 1 (as shown in FIG. 7), and therefore the first light-shielding sheet S1 will receive light that is several times larger than the non-optical effective area L1R4 of the second surface 12 of the first lens element 1, which on the contrary causes the first light-shielding sheet S1 to have the appearance with the gray ring. If the periphery region 214 of the object-side surface L2R1 of the second lens element 2 is convex, and the periphery region 224 of the image-side surface L2R3 of the second lens element 2 is concave, a large amount of light will be condensed when the imaging light passes through the second lens element 2, and therefore the minimum-aperture light-shielding sheet SS will receive light that is several times larger than the non-optical effective area L2R4 of the second surface 22 of the second lens element 2, which on the contrary causes the minimum-aperture light-shielding sheet SS to have the appearance with the gray ring (like R3 shown in FIG. 11).

On the contrary, in the optical imaging lens 10 of the first embodiment of the disclosure, by arranging the optical film at the first surface SS1 of the minimum-aperture light-shielding sheet SS, so that the ratio of the reflectance of the non-optical effective area L1R4 of the second surface 12 of the first lens element 1 to the reflectance of the first surface SS1 of the minimum-aperture light-shielding sheet SS is in a proper range. In this way, the color difference between the black color exposed by the non-optical effective area L1R4 of the second surface 12 of the first lens element 1 and the black color of the first surface SS1 exposed by the minimum-aperture light-shielding sheet SS looks more similar to human eye, so that the optical imaging lens 10 presents a nearly uniform black appearance under the illumination of a light source. When the optical imaging lens 10 is installed in a portable electronic device, the optical imaging lens can be well hidden in the black appearance of the portable electronic device.

Figure 12:
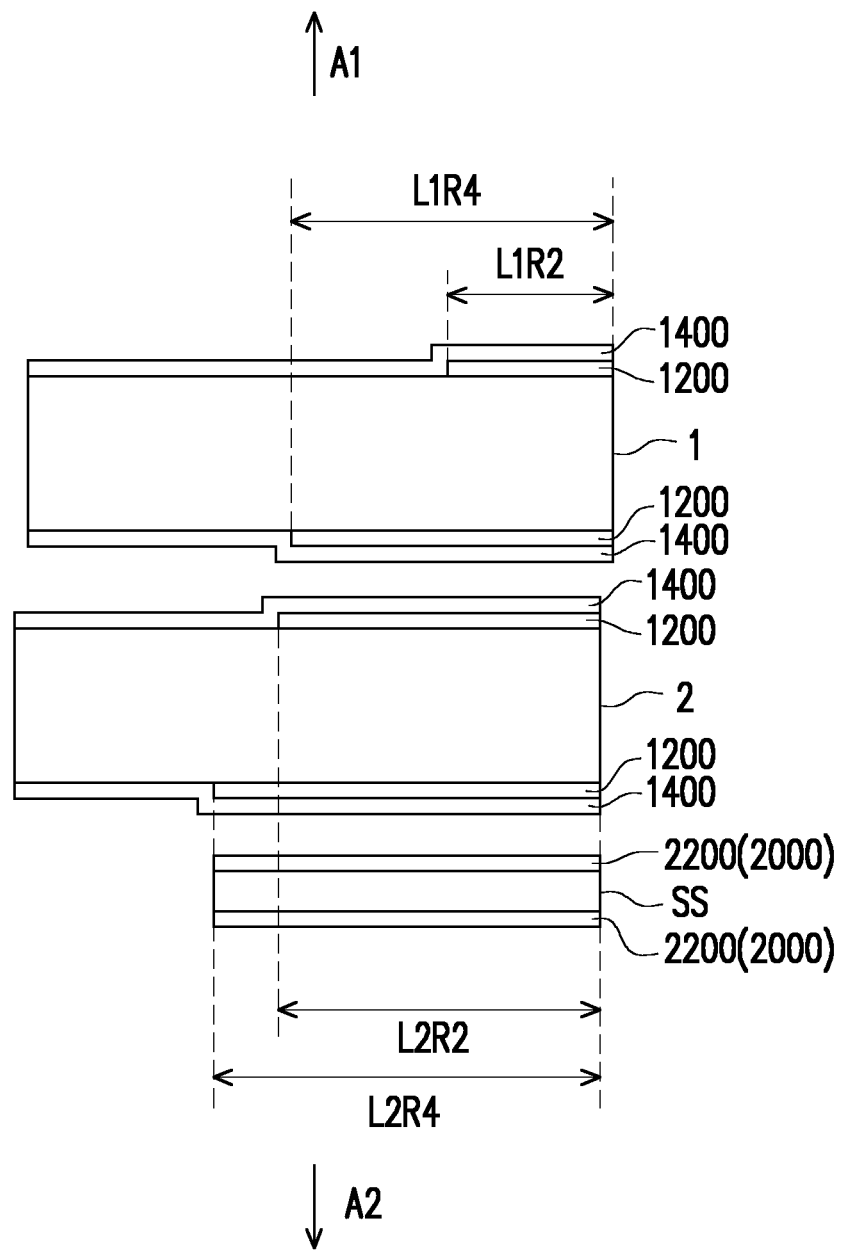
FIG. 12 is a schematic view showing the arrangement of optical layers on the optical imaging lens of the second embodiment of the disclosure.

FIG. 12 is a schematic view showing the arrangement of optical layers on the optical imaging lens of the second embodiment of the disclosure. Referring to FIG. 12, the optical imaging lens 10 of the second embodiment is substantially similar to the optical imaging lens 10 of the first embodiment, and the differences between the two are as follows: there is no first light-shielding sheet provided in the front lens element group FL of the optical imaging lens 10 of the second embodiment. Additionally, as shown in FIG. 19, the reflectance of the optical imaging lens 10 of the second embodiment at various lens elements and the light-shielding sheet is more or less different from the optical imaging lens 10 of the first embodiment.

Figure 13:
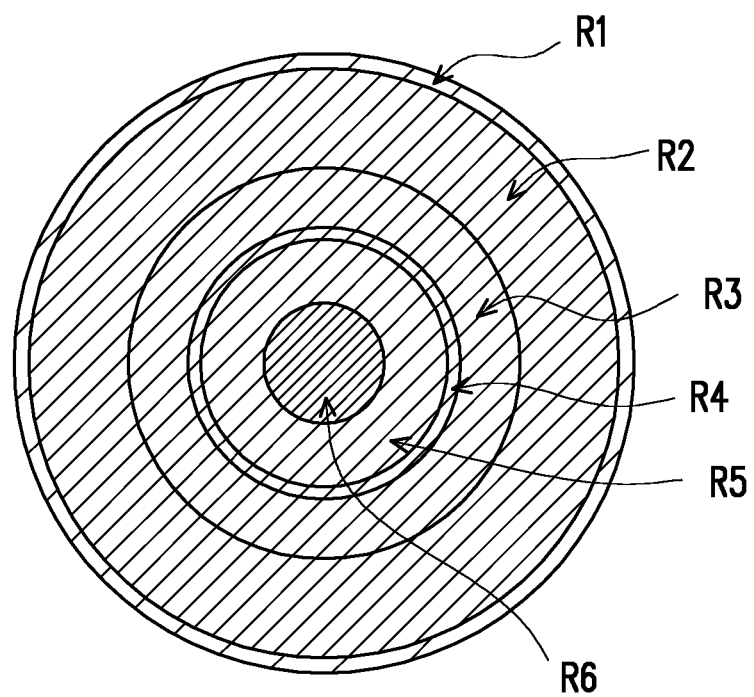
FIG. 13 shows a schematic view of the appearance of the optical imaging lens of the second embodiment of the disclosure, viewing from the object side to the image side.

FIG. 13 shows a schematic view of the appearance of the optical imaging lens of the second embodiment of the disclosure, viewing from the object side A1 to the image side A2. In the optical imaging lens 10 of the second embodiment of the disclosure, the absence of the first light-shielding sheet S1 in the front lens element group FL can reduce the cost and simplify the manufacturing process. By arranging the optical layer at the non-optical effective area L1R4 of the second surface 12 of the first lens element 1 and the first surface SS1 of the minimum-aperture light-shielding sheet SS to absorb stray light, it is possible to make the color difference between the black color of the light-shielding sheet and the exposed lens element to be more similar to human eye.

Figure 14:
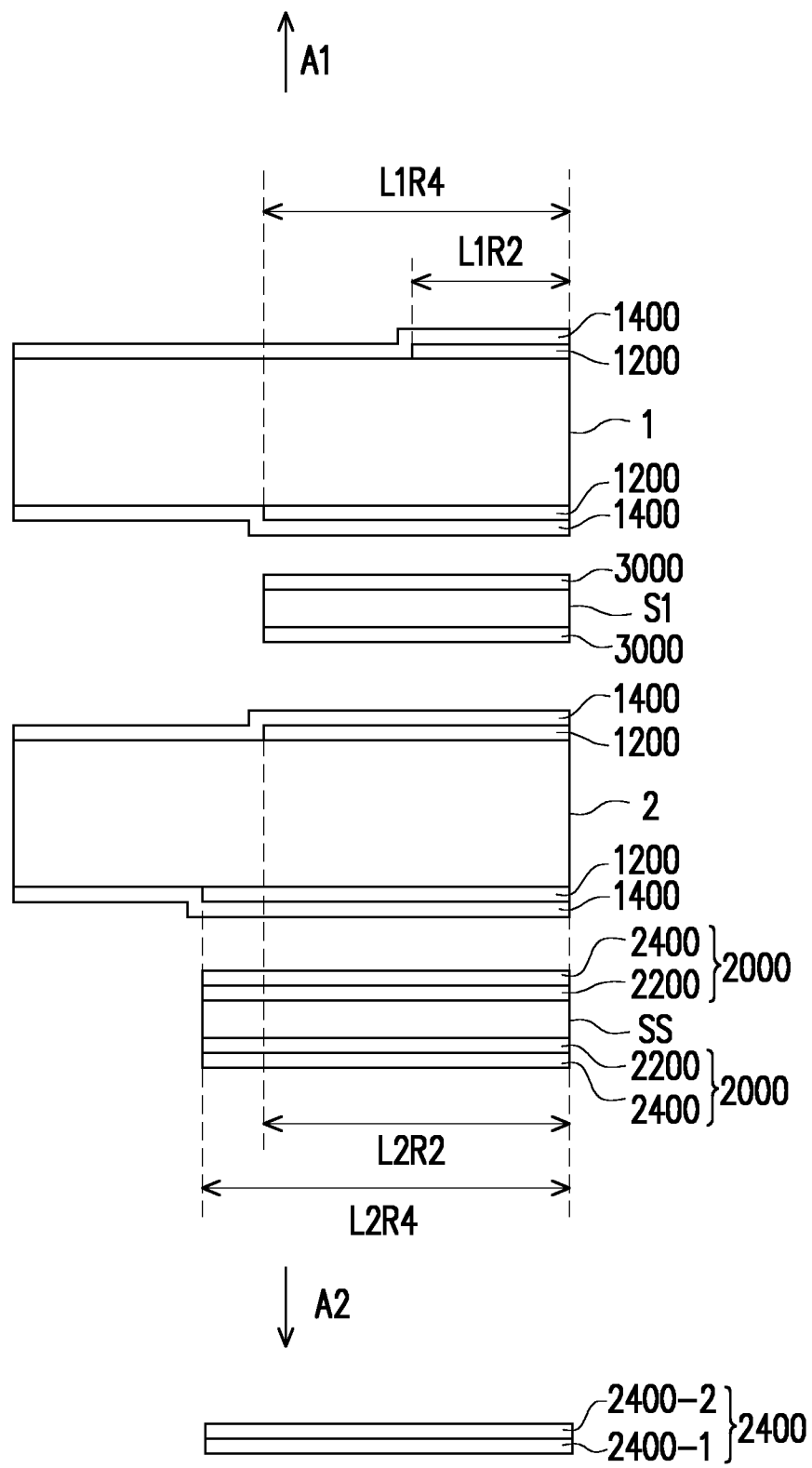
FIG. 14 is a schematic view showing the arrangement of optical layers on the optical imaging lens of the third embodiment of the disclosure.

FIG. 14 is a schematic view showing the arrangement of optical layers on the optical imaging lens of the third embodiment of the disclosure. Referring to FIG. 14, the optical imaging lens 10 of the third embodiment is substantially similar to the optical imaging lens 10 of the first embodiment, and the differences between the two are as follows: In the third embodiment, the optical imaging lens 10 further includes a light-transmitting layer 2400 disposed on the light-absorbing layer 2200. The light-absorbing layer 2200 and the light-transmitting layer 2400 are sequentially stacked on the first surface SS1 and the second surface SS2 of the minimum-aperture light-shielding sheet SS. In an embodiment, the light-transmitting layer 2400 includes at least one first layer 2400-1 and at least one second layer 2400-2. The refractive index of the at least one second layer 2400-2 is lower than the refractive index of the at least one first layer 2400-1, and the at least one first layer 2400-1 and the at least one second layer 2400-2 are alternately stacked on the minimum-aperture light-shielding sheet SS. In addition, as shown in FIG. 19, the reflectance of the optical imaging lens 10 of the third embodiment at various lens elements and the light-shielding sheet is more or less different from the optical imaging lens 10 of the first embodiment.

Based on the above, in the optical imaging lens 10 of the third embodiment of the disclosure, since the first light-shielding sheet S1 is provided in the front lens element group FL, the effect of improving system stray light is better, and the reflectance of the minimum-aperture light-shielding sheet SS is higher, so that the color of the minimum-aperture light-shielding sheet SS is not too dark. In this way, the color difference between the black color of the light-shielding sheet and the exposed lens element is more similar to human eye.

Figure 15:
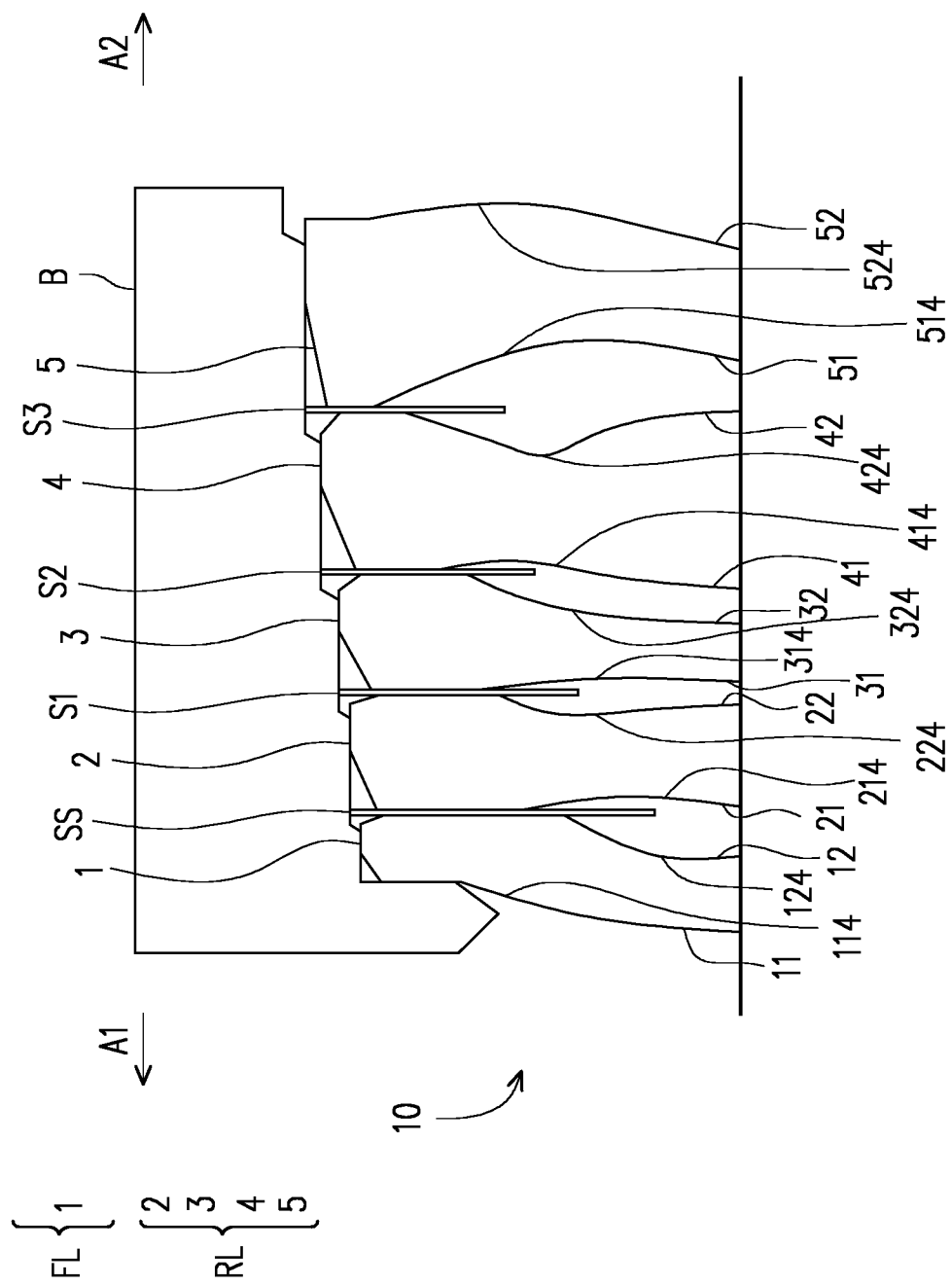
FIG. 15 is a schematic view of an optical imaging lens according to a fourth embodiment of the disclosure.
Figure 16:
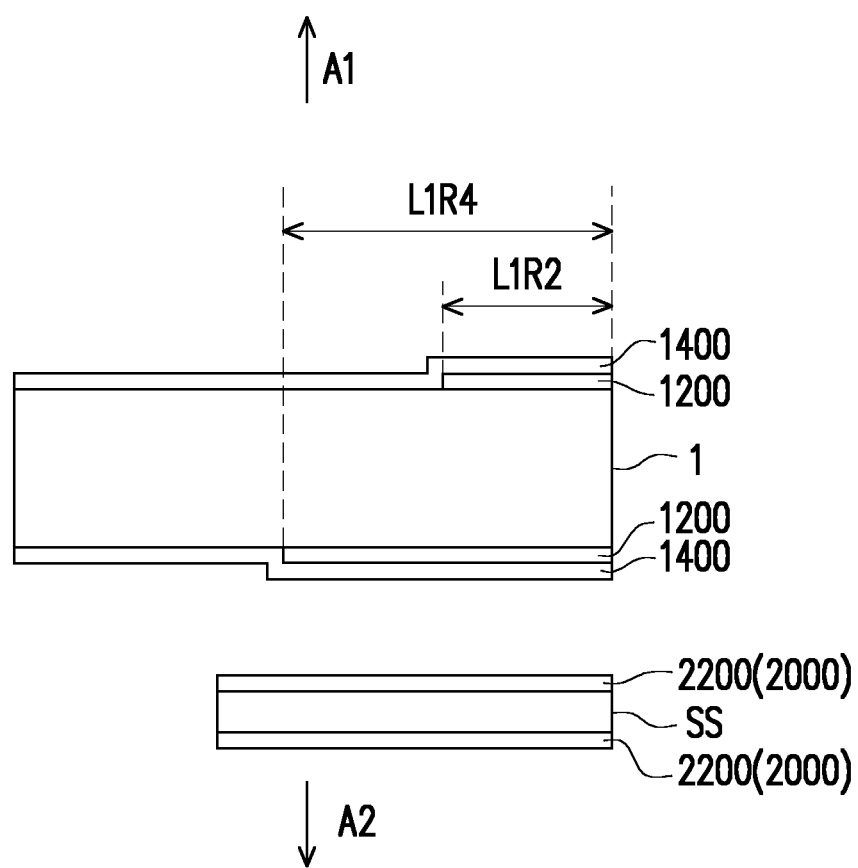
FIG. 16 is a schematic view showing the arrangement of optical layers on the optical imaging lens of the fourth embodiment of the disclosure.

FIG. 15 is a schematic view of an optical imaging lens according to a fourth embodiment of the disclosure. FIG. 16 is a schematic view showing the arrangement of optical layers on the optical imaging lens of the fourth embodiment of the disclosure. Referring to FIG. 15 and FIG. 16, the optical imaging lens 10 of the fourth embodiment is substantially similar to the optical imaging lens 10 of the first embodiment, and the differences between the two are as follows: In the fourth embodiment, the front lens element group FL of the optical imaging lens 10 includes a first lens element 1, and the rear lens element group RL includes a second lens element 2, a third lens element 3, a fourth lens element 4, and a fifth lens element 5. The effective radius SD11 of the object-side surface L1R1 of the first lens element 1 is 0.870 mm, and the effective radius SD12 of the image-side surface L1R3 of the first lens element 1 is 0.620 mm. A periphery region 214 of the object-side surface L2R1 of the second lens element 2 is convex. A periphery region 224 of the image-side surface L2R3 of the second lens element 2 is convex. A periphery region 314 of the object-side surface L3R1 of the third lens element 3 is concave. A periphery region 324 of the image-side surface L3R3 of the third lens element 3 is concave. A periphery region 414 of the object-side surface L4R1 of the fourth lens element 4 is convex. A periphery region 424 of the image-side surface L4R3 of the fourth lens element 4 is convex. A periphery region 514 of the object-side surface L5R1 of the fifth lens element 5 is concave. A periphery region 524 of the image-side surface L5R3 of the fifth lens element 5 is convex. In addition, as shown in FIG. 19, the reflectance of the optical imaging lens 10 of the fourth embodiment at various lens elements and the light-shielding sheet is more or less different from the optical imaging lens 10 of the first embodiment. It should be noted here that, in order to clearly show the drawing, the reference numerals representing the object-side surface, the image-side surface, and the non-optical effective area similar to those in the first embodiment are omitted in FIG. 15.

Figure 17:
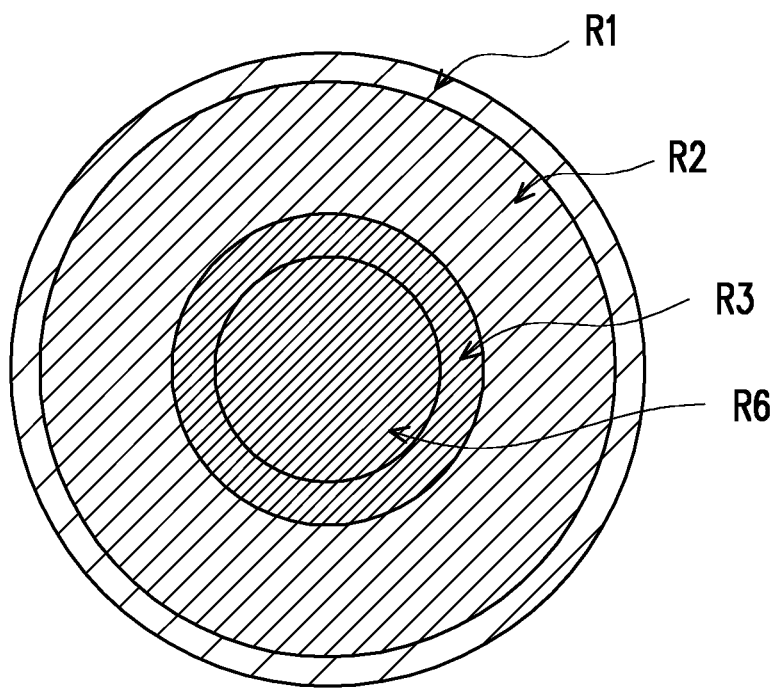
FIG. 17 shows a schematic view of the appearance of the optical imaging lens of the fourth embodiment of the disclosure, viewing from the object side to the image side.

FIG. 17 shows a schematic view of the appearance of the optical imaging lens of the fourth embodiment of the disclosure, viewing from the object side A1 to the image side A2. In the optical imaging lens 10 of the fourth embodiment of the disclosure, since the optical film 2000 disposed on the minimum-aperture light-shielding sheet SS is the light-absorbing layer 2200, the black color exposed by the light-shielding sheet becomes darker.

Figure 18:
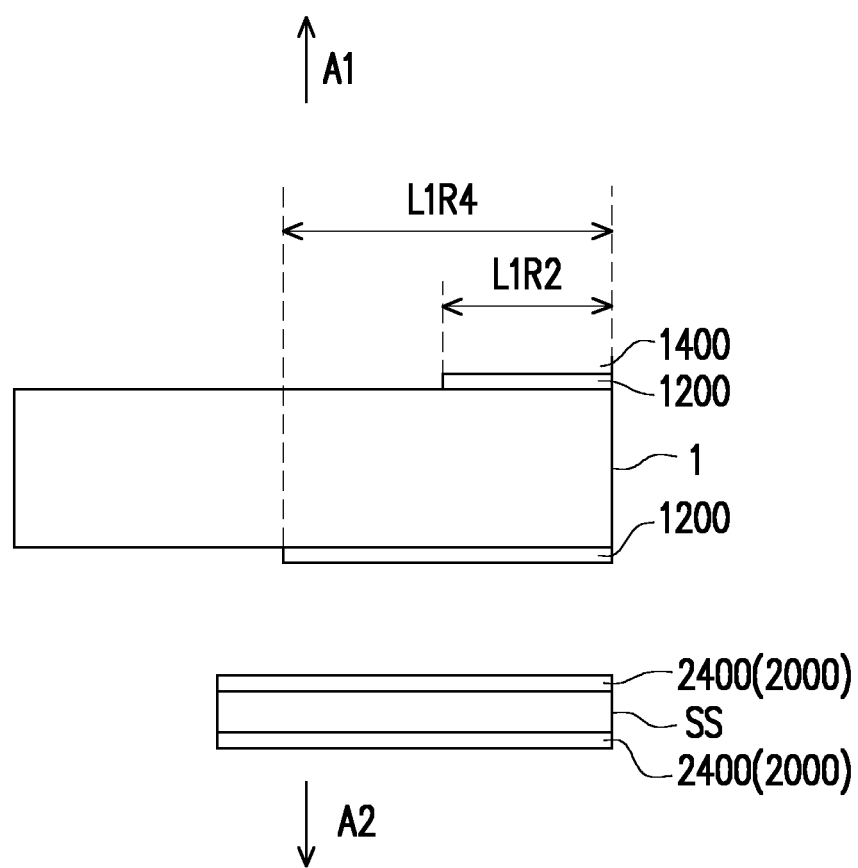
FIG. 18 is a schematic view showing the arrangement of optical layers on the optical imaging lens of the fifth embodiment of the disclosure.

FIG. 18 is a schematic view showing the arrangement of optical layers on the optical imaging lens of the fifth embodiment of the disclosure. Referring to FIG. 18, the optical imaging lens 10 of the fifth embodiment is substantially similar to the optical imaging lens 10 of the fourth embodiment, and the differences between the two are as follows: In the fifth embodiment, each lens element is not provided with the light-transmitting layer 1400, the optical film 2000 disposed on the minimum-aperture light-shielding sheet SS is a light-transmitting layer 2400, wherein the light-transmitting layer 2400 may include at least one first layer 2400-1 and at least one second layer 2400-2, as shown in FIG. 14. In addition, as shown in FIG. 19, the reflectance of the optical imaging lens 10 of the fifth embodiment at various lens elements and the light-shielding sheet is more or less different from the optical imaging lens 10 of the fourth embodiment.

Based on the above, in the optical imaging lens 10 of the fifth embodiment of the disclosure, since the optical film 2000 provided on the minimum-aperture light-shielding sheet SS is the light-transmitting layer 2400, it is advantageous for mass production at one time. The other advantages of the optical imaging lens 10 of the fifth embodiment are similar to those of the first embodiment, and no further description is incorporated herein.

Further referring to FIG. 19, FIG. 19 shows important parameters and relation values thereof pertaining to the optical imaging lens according to the comparative example and the first through the fifth embodiments of the disclosure.

In addition, any combination of the parameters and relations in the embodiments can be selected to increase limitation to the lens, so as to facilitate the lens design of the disclosure with the same architecture.

In summary, the optical imaging lens of the embodiment of the disclosure can achieve the following effects and advantages:

1. The optical imaging lens of the embodiment of the disclosure satisfies the following condition: 2.200≤RLavg/RS0avg and RLavg≤3.000%. When the optical imaging lens of the embodiment of the disclosure satisfies the condition of 2.200≤RLavg/RS0avg, by increasing the ratio of the reflectance of the non-optical effective area of the second surface of the first lens element to the reflectance of the minimum-aperture light-shielding sheet, with the effect of the curved surface of the lens element, the color difference between the black color exposed by the non-optical effective area of the second surface of the first lens element and the black color exposed by the minimum-aperture light-shielding sheet looks more similar to human eye, so that the optical imaging lens presents a nearly uniform black appearance under the illumination of a light source. When the optical imaging lens is disposed in a portable electronic device, the optical imaging lens can be well hidden in the black appearance of the portable electronic device. In a preferred embodiment, the preferred range is 2.200≤RLavg/RS0avg≤28.000, which can prevent the reflectance of the light-shielding sheet from being too low and affecting the appearance consistency. Compared with the conventional method which intuitively pursues the consistency between the reflectance of the lens element and the reflectance of the light-shielding sheet, the optical imaging lens of the embodiment of the disclosure has a better effect in achieving smaller color difference in the appearance of the lens.

2. The optical imaging lens of the embodiment of the disclosure satisfies the following condition: SD11/SD12≥1.300, RS0avg≤0.475%, and RLavg≤3.000%. When SD11/SD12 is greater than 1.300, and when the user observes from the object side of the optical imaging lens, the second surface of the first lens element will be exposed and occupy about 40% of the optical effective area of the first surface of the first lens element (that is, the object-side surface), which in turn affects the appearance of the optical imaging lens. When the condition of RS0avg 0.475% and condition of RLavg≤3.000% are satisfied simultaneously, the color difference between the black color exposed by the non-optical effective area of the second surface of the first lens element and the black color exposed by the minimum-aperture light-shielding sheet looks more similar to human eye, it is possible to make the optical imaging lens appear nearly uniformly black under the illumination of a light source. When the optical imaging lens is disposed in a portable electronic device, the optical imaging lens can be well hidden in the black appearance of the portable electronic device.

3. In the optical imaging lens of the embodiment of the disclosure, when the periphery region of the object-side surface of the first lens element is designed to be convex, or the periphery region of the image-side surface of the first lens element is designed to be concave, by more specifically limiting the curved surface shape of the first lens element of the optical imaging lens, along with increasing the ratio of the reflectance of the non-optical effective area of the second surface of the first lens element to the reflectance of the minimum-aperture light-shielding sheet, it is possible to make the color difference between the black color exposed by the non-optical effective area of the second surface of the first lens element and the black color exposed by the minimum-aperture light-shielding sheet to look more similar to human eye.

Fourth, in the optical imaging lens of the embodiment of the disclosure, when the periphery region of the object-side surface of the second lens element is designed to be convex, or the periphery region of the image-side surface of the second lens element is designed to be concave, by more specifically limiting the curved surface shape of the second lens element of the optical imaging lens, along with increasing the ratio of the reflectance of the non-optical effective area of the second surface of the first lens element to the reflectance of the minimum-aperture light-shielding sheet, it is possible to make the color difference between the black color exposed by the non-optical effective area of the second surface of the second lens element and the black color exposed by the minimum-aperture light-shielding sheet to look more similar to human eye.

The contents in the embodiments of the disclosure include but are not limited to a focal length, a thickness of a lens element, an Abbe number, or other optical parameters. For example, in the embodiments of the disclosure, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A-B or AB or A*B or (A*B)1/2, and E satisfies a conditional expression E≤$\gamma_1$ or E≥$\gamma_2$ or where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the disclosure. The aforementioned description is for exemplary explanation, but the disclosure is not limited thereto.

The embodiments of the disclosure are all implementable. In addition, a combination of partial features in a same embodiment can be selected, and the combination of partial features can achieve the unexpected result of the disclosure with respect to the prior art. The combination of partial features includes but is not limited to the surface shape of a lens element, a refracting power, a conditional expression or the like, or a combination thereof. The description of the embodiments is for explaining the specific embodiments of the principles of the disclosure, but the disclosure is not limited thereto. Specifically, the embodiments and the drawings are for exemplifying, but the disclosure is not limited thereto.

Although the disclosure has been disclosed as above by way of embodiments, it is not intended to limit the disclosure. Any person with ordinary knowledge in the technical field can make some changes and decorations without departing from the spirit and scope of the disclosure, so the protection scope of the disclosure shall be determined by the scope of the attached claims.

What is claimed is:

1. An optical imaging lens, comprising a front lens element group, a minimum-aperture light-shielding sheet and a rear lens element group sequentially arranged along an optical axis from an object side to an image side, wherein the front lens element group comprises a first lens element, the first lens element comprises a first surface facing the object side and a second surface facing the image side, the first surface comprises an object-side surface allowing imaging rays to pass through and a non-optical effective area, the second surface comprises an image-side surface allowing the imaging rays to pass through and a non-optical effective area;

the optical imaging lens further comprises a light-absorbing layer disposed on the non-optical effective area of the second surface of the first lens element, the non-optical effective area of the second surface of the first lens element has a maximum reflectance as RLmax, a minimum reflectance as RLmin, and a maximum minimum average reflectance as RLavg=(RLmax+RLmin)/2 at an optical wavelength in a range of 450 to 750 nm;

the minimum-aperture light-shielding sheet comprises a first surface facing the object side, and an inner edge radius of the minimum-aperture light-shielding sheet is smaller than an effective radius of the image-side surface of the first lens element;

the optical imaging lens further comprises an optical film arranged on the first surface of the minimum-aperture light-shielding sheet, the first surface of the minimum-aperture light-shielding sheet has a maximum reflectance as RS0max, a minimum reflectance as RS0min, and a maximum minimum average reflectance as RS0avg=(RS0max+RS0min)/2 at the optical wavelength in the range of 450 to 750 nm; and the optical imaging lens satisfies the following conditions of $2.200 \leq RLavg/RS0avg$ and $RLavg \leq 3.000\%$.

2. The optical imaging lens according to claim 1, wherein a material of the light-absorbing layer comprises a black resin material.

3. The optical imaging lens according to claim 1, wherein the minimum-aperture light-shielding sheet is a black light-absorbing sheet.

4. The optical imaging lens according to claim 1, wherein the optical film is a light-absorbing layer, the light-absorbing layer is a metal nitride, a metal fluoride, a metal hydride, a metal oxide, a semiconductor element, a nitride of the semiconductor element, a fluoride of the semiconductor element, a hydride of the semiconductor element, or a hydroxide of the semiconductor element or a combination of the above.

5. The optical imaging lens according to claim 1, wherein a periphery region of the object-side surface of the first lens element is convex.

6. The optical imaging lens according to claim 1, wherein a periphery region of the image-side surface of the first lens element is concave.

7. The optical imaging lens according to claim 1, wherein the front lens element group further comprises a second lens element, the second lens element comprises a first surface facing the object side, and the first surface of the second lens element comprises an object-side surface allowing the imaging rays to pass through, a periphery region of the object-side surface of the second lens element is convex.

8. The optical imaging lens according to claim 1, wherein the front lens element group further comprises a second lens element, the second lens element comprises a first surface facing the object side and a second surface facing the image side, and the second surface comprises an image-side surface allowing the imaging rays to pass through, a periphery region of the image-side surface of the second lens element is concave.

9. The optical imaging lens according to claim 1, wherein the optical imaging lens comprises a light-transmitting layer disposed on a light-absorbing layer of the non-optical effective area of the second surface of the first lens element, and the optical imaging lens further satisfies the following condition: $RLavg \leq 1.200\%$.

10. The optical imaging lens according to claim 1, wherein the front lens element group further comprises a first light-shielding sheet, the optical imaging lens further satisfies the following condition: $2.200 \leq RLavg/RS0avg \leq 15.000$.

11. An optical imaging lens, comprising a front lens element group, a minimum-aperture light-shielding sheet and a rear lens element group sequentially arranged along an optical axis from an object side to an image side, wherein the front lens element group comprises a first lens element, the first lens element comprises a first surface facing the object side and a second surface facing the image side, the first surface comprises an object-side surface allowing imaging rays to pass through and a non-optical effective area, the second surface comprises an image-side surface allowing the imaging rays to pass through and a non-optical effective area;

the optical imaging lens further comprises a light-absorbing layer disposed on the non-optical effective area of the second surface of the first lens element, the non-optical effective area of the second surface of the first lens element has a maximum reflectance RLmax, a minimum reflectance RLmin, and a maximum minimum average reflectance RLavg=(RLmax+RLmin)/2 at an optical wavelength in a range of 450 to 750 nm;

the minimum-aperture light-shielding sheet comprises a first surface facing the object side, and an inner edge radius of the minimum-aperture light-shielding sheet is smaller than an effective radius of the image-side surface of the first lens element;

the optical imaging lens further comprises an optical film arranged on the first surface of the minimum-aperture light-shielding sheet, the first surface of the minimum-aperture light-shielding sheet has a maximum reflectance RS0max, a minimum reflectance RS0min, and a maximum minimum average reflectance RS0avg=(RS0max+RS0min)/2 at the optical wavelength in the range of 450 to 750 nm; and the optical imaging lens satisfies the following conditions: $SD11/SD12 \geq 1.300$, $RS0avg \leq 0.475\%$, and RLavg≤3.000%, wherein SD11 is an effective radius of the object-side surface of the first lens element, and SD12 is the effective radius of the image-side surface of the first lens element.

12. The optical imaging lens according to claim 11, wherein a periphery region of the object-side surface of the first lens element is convex.

13. The optical imaging lens according to claim 11, wherein a periphery region of the image-side surface of the first lens element is concave.

14. The optical imaging lens according to claim 11, wherein the front lens element group further comprises a first light-shielding sheet, the first light-shielding sheet comprises a first surface facing the object side, and the optical imaging lens further comprises an optical film disposed on the first surface of the first light-shielding sheet, the first surface of the first light-shielding sheet has a maximum reflectance RS1max, a minimum reflectance RS1min and a maximum minimum average reflectance RS1avg= (RS1max+RS1min)/2 at the optical wavelength in the range of 450 to 750 nm, the optical imaging lens further satisfies the following conditions: SD11/SD12≥1.600 and 4.000≤RLavg/RS1avg.

15. The optical imaging lens according to claim 11, wherein the front lens element group further comprises a first light-shielding sheet, the first light-shielding sheet comprises a first surface facing the object side, the first surface comprises an optical film disposed thereon, the first surface of the first light-shielding sheet has a maximum reflectance RS1max, a minimum reflectance RS1 min and a maximum minimum average reflectance RS1avg=(RS1max+ RS1min)/2 at the optical wavelength in the range of 450 to 750 nm, the optical imaging lens further satisfies the following conditions: SD11/SD12≥1.600 and RS1avg≤0.200%.

16. The optical imaging lens according to claim 11, wherein the optical film is a light-transmitting layer, the light-transmitting layer comprises at least one first layer and at least one second layer, a refractive index of the at least one second layer is lower than a refractive index of the at least one first layer, and the at least one first layer and the at least one second layer are alternately stacked on the minimum-aperture light-shielding sheet.

17. The optical imaging lens according to claim 11, wherein the optical imaging lens comprises a light-transmitting layer disposed on a light-absorbing layer of the non-optical effective area of the second surface of the first lens element, and the optical imaging lens further satisfies the following condition: RLavg≤1.200%.

18. The optical imaging lens according to claim 11, wherein the front lens element group further comprises a first light-shielding sheet, the first light-shielding sheet comprises a first surface facing the object side, the optical imaging lens further comprises an optical film disposed on the first surface of the first light-shielding sheet, the first surface of the first light-shielding sheet has a maximum reflectance RS1max, a minimum reflectance RS1min and a maximum minimum average reflectance RS1avg= (RS1max+RS1min)/2 at the optical wavelength in the range of 450 to 750 nm, the optical imaging lens further satisfies the following condition: 1.100≤RS0avg/RS1avg.

19. The optical imaging lens according to claim 11, wherein the front lens element group further comprises a first light-shielding sheet, the optical imaging lens further satisfies the following condition: 2.200≤RLavg/RS0avg≤15.000.

20. The optical imaging lens according to claim 11, wherein the optical imaging lens further comprises a light-transmitting layer disposed on the light-absorbing layer of the minimum-aperture light-shielding sheet.

\* \* \* \* \*